(12) United States Patent
Yashiki et al.

(10) Patent No.: US 10,347,891 B2
(45) Date of Patent: Jul. 9, 2019

(54) LAMINATED SEPARATOR ROLL

(71) Applicant: Sumitomo Chemical Company, Limited, Tokyo (JP)

(72) Inventors: Daizaburo Yashiki, Niihama (JP); Takahiro Okugawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 91 days.

(21) Appl. No.: 15/602,390

(22) Filed: May 23, 2017

(65) Prior Publication Data

US 2017/0346061 A1   Nov. 30, 2017

(30) Foreign Application Priority Data

May 26, 2016   (JP) .................................. 2016-105235

(51) Int. Cl.
*H01M 2/16* (2006.01)
*H01M 2/18* (2006.01)
*B32B 27/00* (2006.01)
*H01M 10/0525* (2010.01)

(52) U.S. Cl.
CPC ........... *H01M 2/1686* (2013.01); *B32B 27/00* (2013.01); *H01M 2/1653* (2013.01); *H01M 2/18* (2013.01); *H01M 10/0525* (2013.01)

(58) Field of Classification Search
None
See application file for complete search history.

(56) References Cited

U.S. PATENT DOCUMENTS

| | | | |
|---|---|---|---|
| 2013/0052523 A1* | 2/2013 | Yamada | H01M 10/0567 429/199 |
| 2017/0033348 A1* | 2/2017 | Murakami | H01M 2/1686 |
| 2017/0114931 A1* | 4/2017 | Glejbol | F16L 11/083 |
| 2017/0162850 A1* | 6/2017 | Murakami | B32B 5/32 |
| 2017/0263905 A1* | 9/2017 | Ogata | H01M 2/166 |

FOREIGN PATENT DOCUMENTS

JP            3194816 U      12/2014

* cited by examiner

*Primary Examiner* — Scott J. Chmielecki
(74) *Attorney, Agent, or Firm* — Panitch Schwarze Belisario & Nadel LLP

(57) ABSTRACT

In the present invention, in laminated separator rolls 12U and 12L, laminated long separator sheets 12a and 12b are wound such that a surface B (which is of an aramid layer (heat-resistant layer) and is opposite to a surface contacting with the porous film) faces an inner side (core u, l side). From this, it is possible to provide the laminated separator roll which can inhibit change in color of the porous layer included in the porous long separator sheet.

3 Claims, 7 Drawing Sheets

LAMINATED SEPARATOR ROLL

This Nonprovisional application claims priority under 35 U.S.C. § 119 on Patent Application No. 2016-105235 filed in Japan on May 26, 2016, the entire contents of which is hereby incorporated by reference.

TECHNICAL FIELD

The present invention relates to a laminated separator roll in which a laminated long separator sheet, which is used in a battery such as a lithium-ion battery, is wound on a core.

BACKGROUND ART

A separator original sheet used in a lithium-ion battery is slit (cut) in a machine direction of the original sheet, and thus a plurality of long separator sheets are obtained each of which has a predetermined width in a direction perpendicular to the machine direction. Each of the plurality of long separator sheets is wound on a core and is then supplied to a battery production process as a separator roll. In the battery production process, each of the plurality of long separator sheets is cut in a predetermined length in a direction perpendicular to the machine direction, and is thus used as a separator.

Patent Literature 1 discloses a method for storing and transporting long separator sheets which are obtained as above described.

CITATION LIST

Patent Literature

[Patent Literature 1]
Japanese utility model registration No. 3194816 (Publication Date: Dec. 11, 2014)

SUMMARY OF INVENTION

Technical Problem

However, in a case where the separator roll is exposed to light in an ultraviolet region (hereinafter, referred to as "UV light") while being stored or the like, a color of the separator roll may change and this causes deterioration in quality of the separator roll. Especially, an outermost surface of a separator roll, in which a long separator sheet having a porous layer containing a resin having a π bonding or halogen atoms is wound, is easily subjected to color change, and therefore inhibition of such color change has been demanded.

Solution to Problem

In order to attain the object, in the laminated separator roll in accordance with an aspect of the present invention, a laminated long separator sheet in which a polyolefin porous base material and a porous layer are laminated is wound on a core; the porous layer contains a resin having a π bonding or halogen atoms; and an outermost surface of the laminated separator roll is constituted by the polyolefin porous base material included in the laminated long separator sheet.

According to the configuration, it is possible to inhibit change in color of the porous layer included in the porous long separator sheet.

Advantageous Effects of Invention

According to an aspect of the present invention, it is possible to inhibit change in color of the porous layer in the laminated separator roll in which the laminated long separator sheet including the porous layer containing a resin having a π bonding or halogen atoms is wound.

Figure 4:
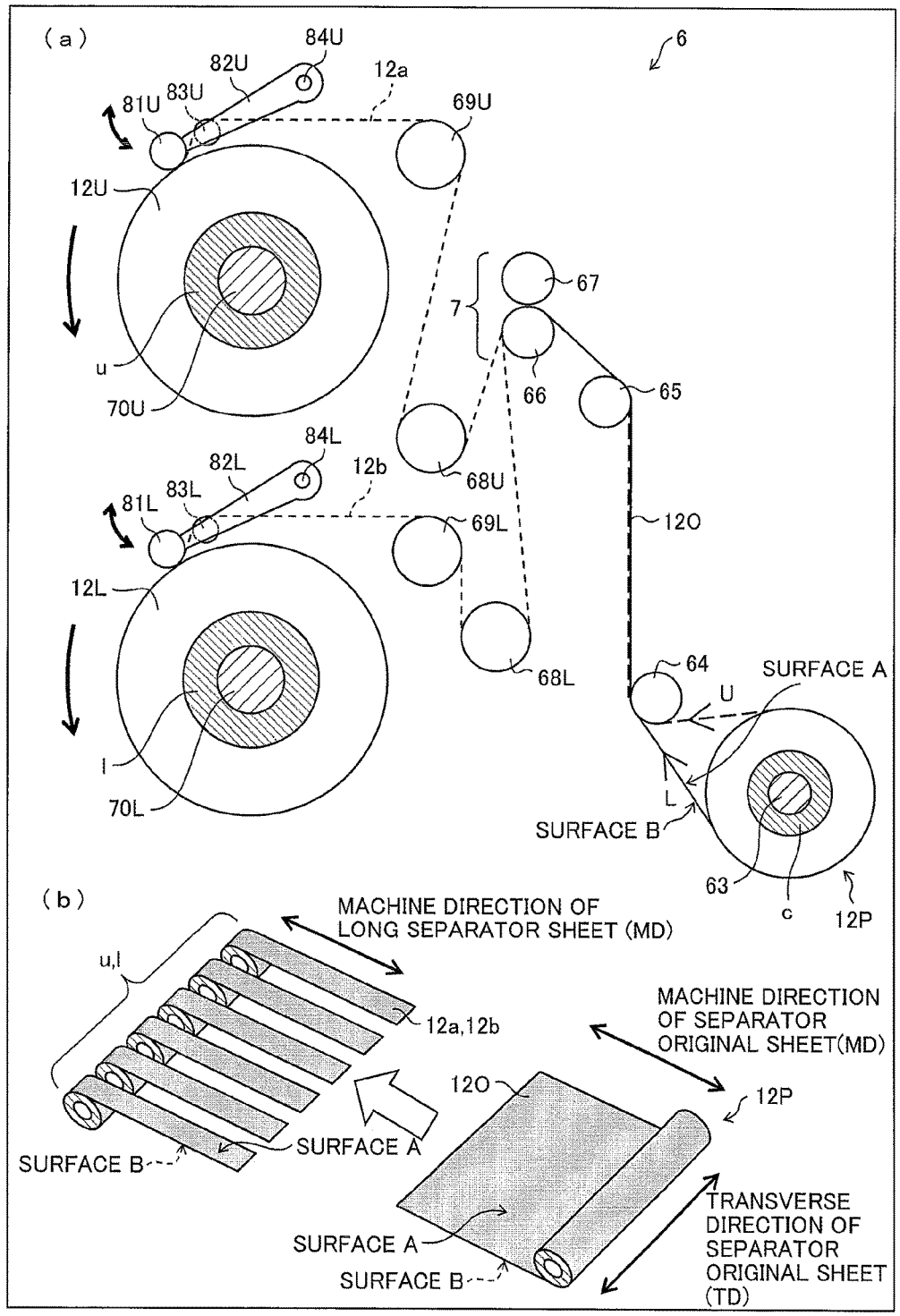

(a) of FIG. 4 is a schematic view illustrating a configuration of a slitting apparatus for slitting a separator original sheet, and (b) of FIG. 4 is a view illustrating a state in which the separator original sheet is slit into a plurality of long separator sheets by the slitting apparatus.

Figure 5:
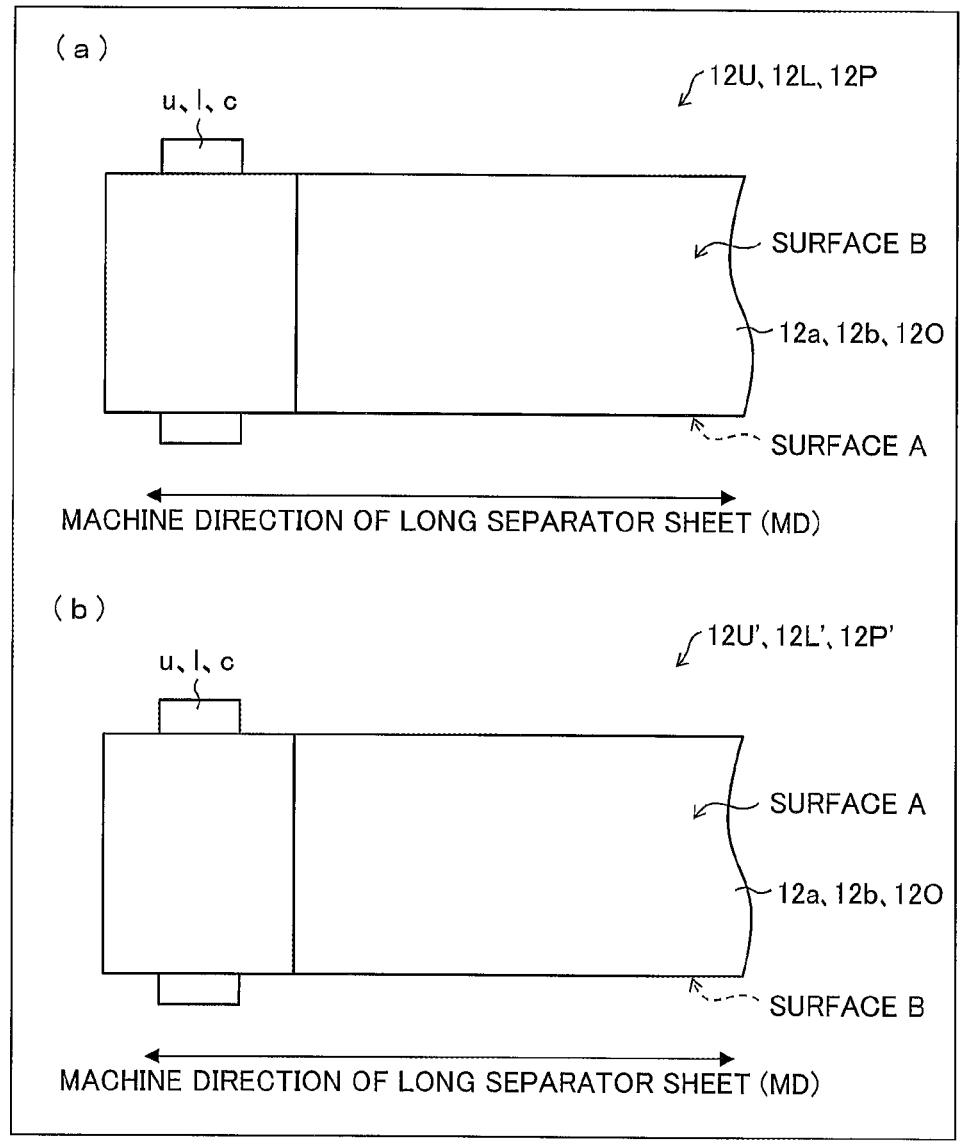

(a) of FIG. 5 is a view illustrating a laminated separator roll in which a laminated long separator sheet is wound such that a porous layer (heat-resistant layer) comes to an inner side (core side). (b) of FIG. 5 is a view illustrating a laminated separator roll in which a laminated long separator sheet is wound such that a porous layer (heat-resistant layer) comes to an outer side (opposite to core side).

Figure 6:
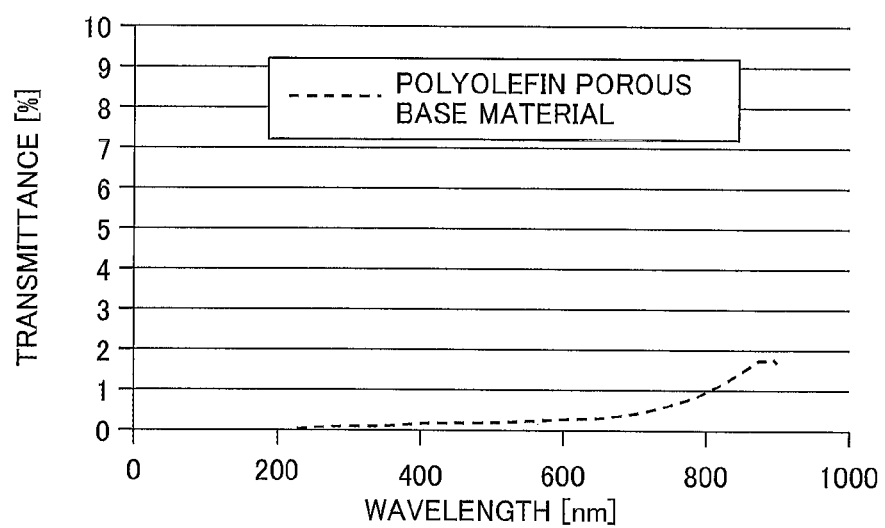

FIG. 6 is a view showing a transmittance of a polyolefin porous base material which is a porous film containing polyolefin.

Figure 7:
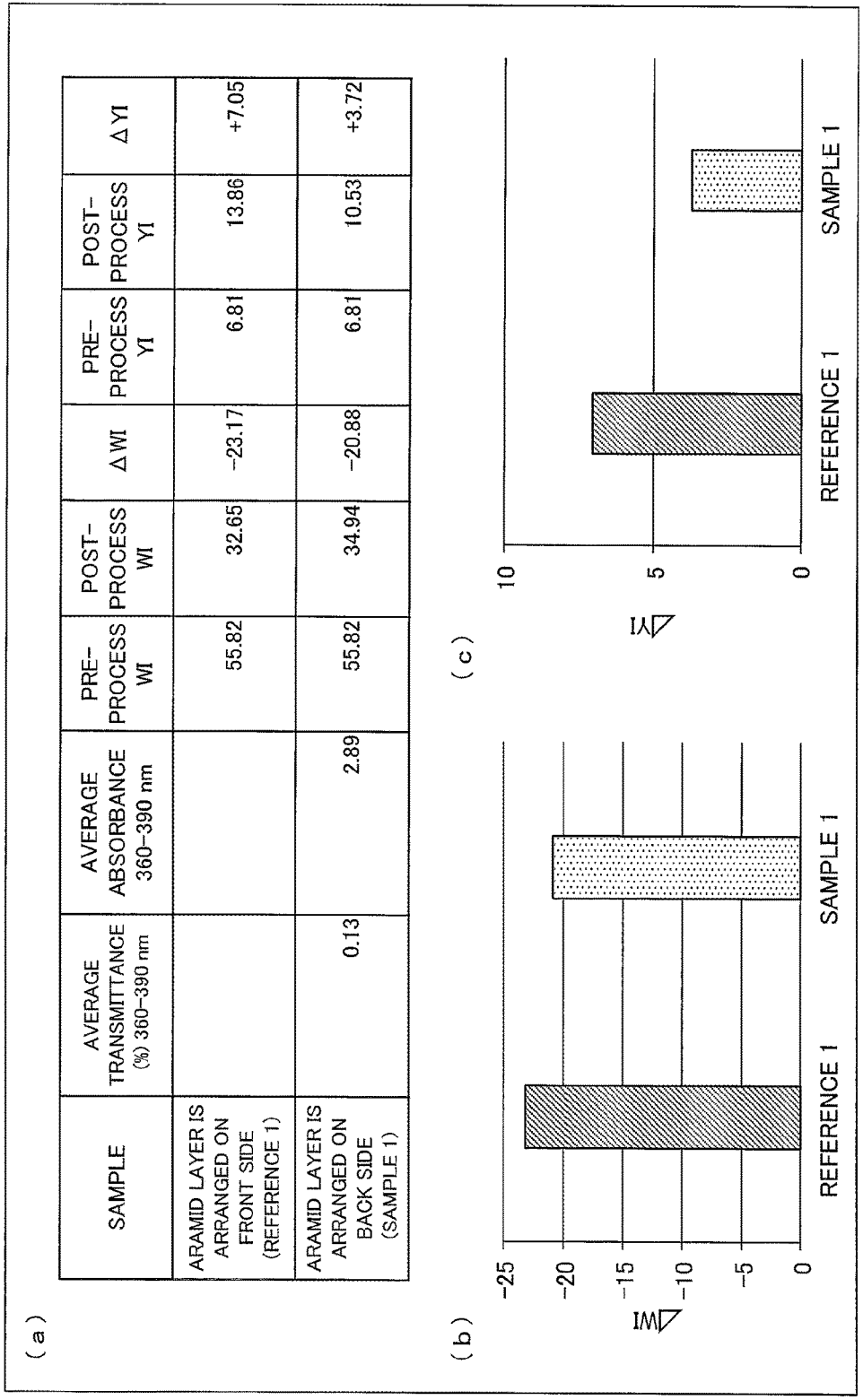

FIG. 7 is a view showing degrees of change in color of a porous layer by irradiation with (i) UV light from a polyolefin porous base material side and (ii) UV light from a porous layer side.

DESCRIPTION OF EMBODIMENTS

[Basic Configuration]

The following description will discuss in order a lithium-ion secondary battery, a separator, a laminated separator, and a method for producing the laminated separator.

(Lithium-Ion Secondary Battery)

A nonaqueous electrolyte secondary battery, typically, a lithium-ion secondary battery has a high energy density, and is therefore currently widely used not only as batteries for use in devices such as personal computers, mobile phones, and mobile information terminals, and for use in moving bodies such as automobiles and airplanes, but also as stationary batteries contributing to stable power supply.

Figure 1:
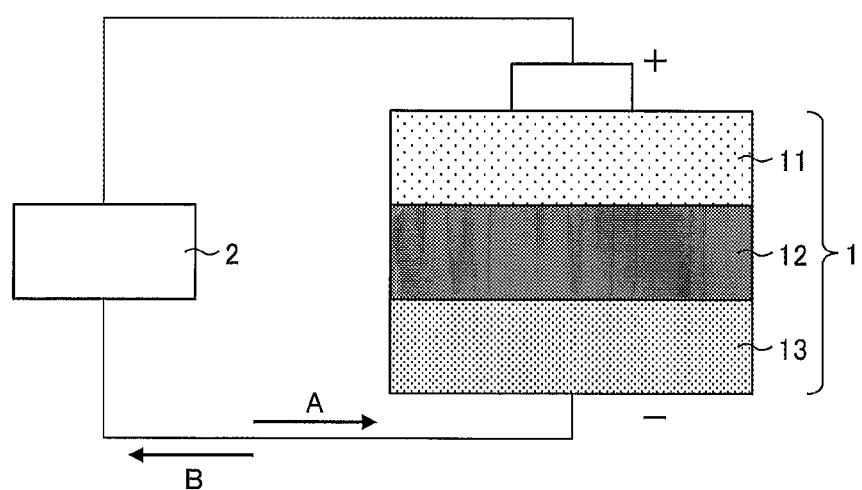
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. While the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1.

The separator 12 is a porous film that separates the cathode 11 and the anode 13, allowing lithium ions to move between the cathode 11 and the anode 13. The separator 12 contains, for example, polyolefin such as polyethylene or polypropylene as a material, and is called "polyolefin porous base material".

Figure 2:
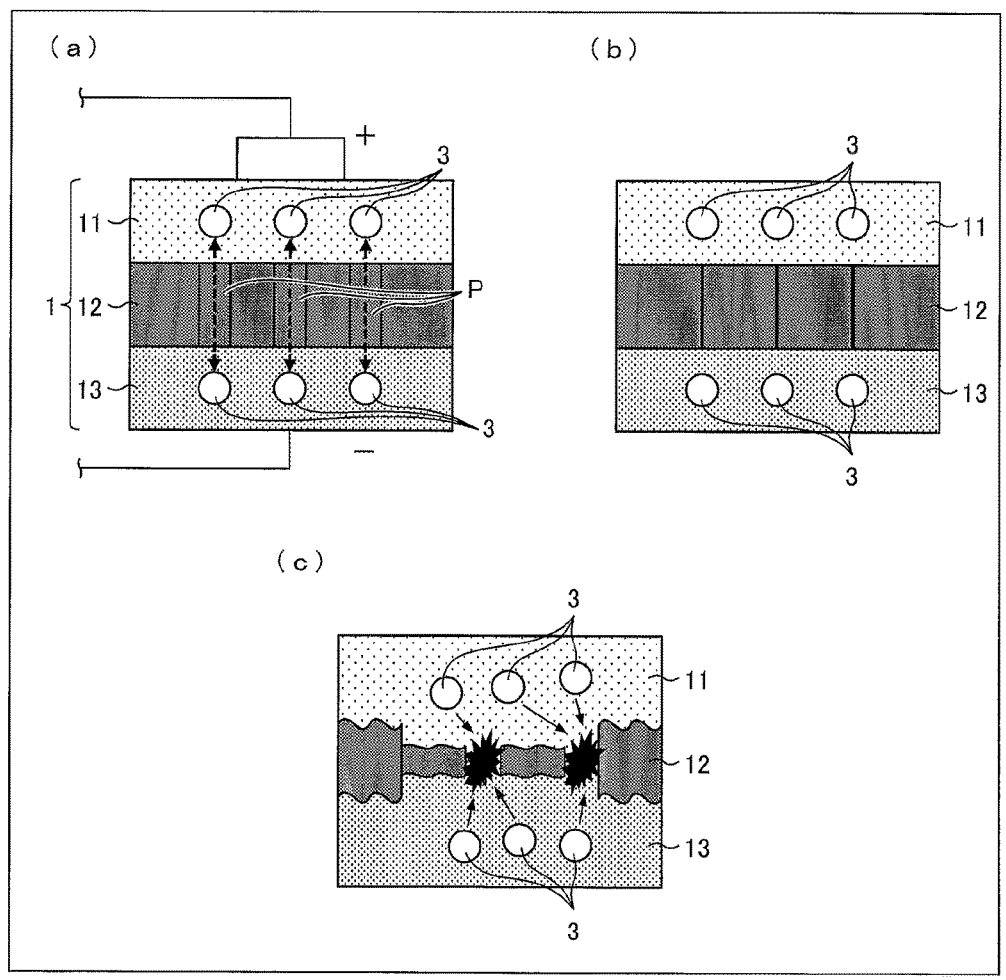
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

Here, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the movement of the lithium ions 3, and consequently stops the above described temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving. Consequently, the temperature continues rising.

(Heat-Resistant Separator)

Figure 3:
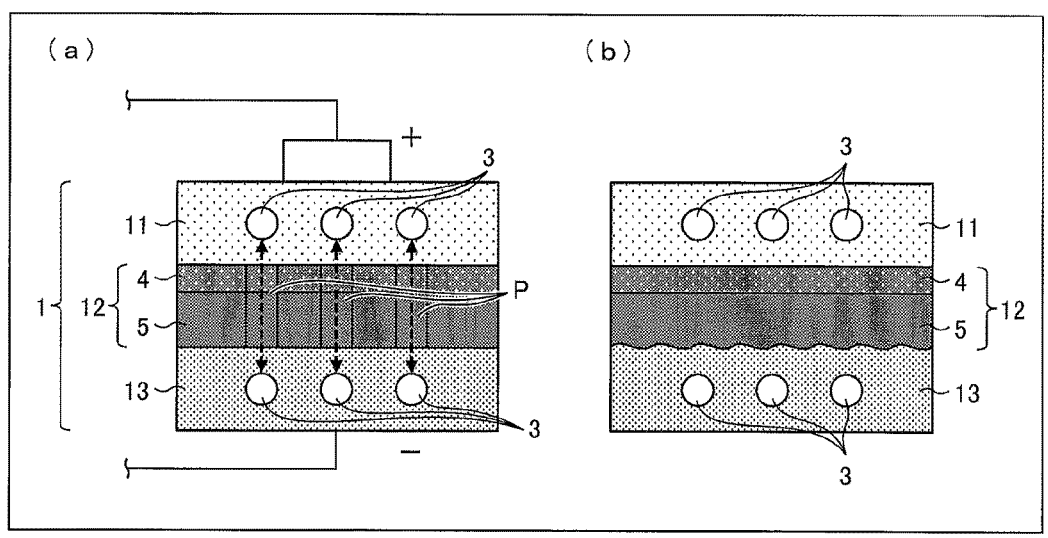
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat-resistant separator that includes a porous film 5 (e.g., a polyolefin porous base material) and a heat-resistant layer 4 (porous layer). The heat-resistant layer 4 is laminated on a surface of the porous film 5 which surface is on a cathode 11 side. Further, the heat-resistant layer 4 is provided with pores which are similar to the pores P. Normally, the lithium ions 3 move through the pores P and the pores of the heat-resistant layer 4. The heat-resistant layer 4 contains, for example, wholly aromatic polyamide (aramid resin) which is an aromatic polymer as a material.

As illustrated in (b) of FIG. 3, even in a case where the temperature of the lithium-ion secondary battery 1 sharply rises and, as a result, the porous film 5 melts or softens, the shape of the porous film 5 is maintained because the heat-resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

(Laminated Separator)

The heat-resistant separator which includes the heat-resistant layer 4 illustrated in FIG. 3 is classified into a laminated separator. Examples of other laminated separator encompass a laminated separator which includes a porous layer such as an adhesive layer or a protective layer, instead of the heat-resistant layer 4.

In an aspect of the present invention, the resin constituting the porous layer such as the heat-resistant layer 4, the adhesive layer, or the protective layer is a resin having a $\pi$ bonding or halogen atoms. The resin easily changes in color when being exposed to UV light. Examples of the resin having a $\pi$ bonding or halogen atoms encompass a polymer having halogen atoms and an aromatic polymer. Specifically, examples of the resin encompass fluorine-containing resins such as polyvinylidene fluoride (PVDF), polytetrafluoroethylene, a vinylidene fluoride-hexafluoropropylene-tetrafluoroethylene copolymer, and an ethylene-tetrafluoroethylene copolymer; a styrene-butadiene copolymer and a hydride thereof; a styrene copolymer such as a styrene-acrylic ester copolymer; aromatic polymers such as aromatic polyamide, wholly aromatic polyamide (aramid resin), polyphenylene ether, polysulfone, polyether sulfone, polyphenylene sulfide, polyetherimide, polyamide imide, polyether amide, and polyester; acrylic polymers such as acrylic ester, methacrylic ester, a methacrylic ester-acrylic ester copolymer, a styrene-acrylic ester copolymer, and an acrylonitrile-acrylic ester copolymer; conjugated diene polymers such as an acrylonitrile-butadiene copolymer and a hydride thereof, and an acrylonitrile-butadiene-styrene copolymer and a hydride thereof; polymers having a cyano group such as cyanoethyl pullulan, cyanoethyl polyvinyl alcohol, cyanoethyl cellulose, and cyanoethyl sucrose; and the like.

The porous layer can contain a filler. The filler, which is not particularly limited to any specific filler, can be a filler made of an organic matter or a filler made of an inorganic matter.

Specific examples of the filler made of an organic matter encompass fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, an ethylene tetrafluoride-propylene hexafluoride copolymer, a tetrafluoroethylene-ethylene copolymer, and polyvinylidene fluoride; melamine resin; urea resin; polyethylene; polypropylene; polyacrylic acid and polymethacrylic acid; and the like.

Specific examples of the filler made of an inorganic matter encompass fillers made of inorganic matters such as calcium carbonate, talc, clay, kaolin, silica, hydrotalcite, diatomaceous earth, magnesium carbonate, barium carbonate, calcium sulfate, magnesium sulfate, barium sulfate, aluminum hydroxide, boehmite, magnesium hydroxide, calcium oxide, magnesium oxide, titanium oxide, titanium nitride, alumina (aluminum oxide), aluminum nitride, mica, zeolite, and glass. The porous layer can contain (i) only one kind of filler or (ii) two or more kinds of fillers in combination.

Among the above fillers, a filler made of an inorganic matter is suitable. A filler made of an inorganic oxide such as silica, calcium oxide, magnesium oxide, titanium oxide, alumina, mica, zeolite, aluminum hydroxide, or boehmite is more preferable. A filler made of at least one kind selected from the group consisting of silica, magnesium oxide, titanium oxide, aluminum hydroxide, boehmite, and alumina is further preferable.

(Production Steps of Heat-Resistant Separator Which is Laminated Separator)

How to produce the heat-resistant separator of the lithium-ion secondary battery 1 is not specifically limited. The heat-resistant separator can be produced by a publicly known method. The following discussion assumes a case where the porous film 5 contains polyethylene as a main material. However, even in a case where the porous film 5 contains another material, the similar steps can still be applied to production of the separator 12.

For example, it is possible to employ a method including the steps of first forming a film by adding a pore forming agent to a thermoplastic resin, and then removing the pore forming agent with an appropriate solvent. For example, in a case where the porous film 5 is made of a polyethylene resin containing ultra-high molecular weight polyethylene, it is possible to produce the porous film 5 by the following method.

This method includes (1) a kneading step of obtaining a polyethylene resin composition by kneading ultra-high molecular weight polyethylene and a pore forming agent such as calcium carbonate or liquid paraffin, (2) a rolling step of forming a film with the polyethylene resin composition, (3) a removal step of removing the pore forming agent from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a predetermined thickness and a predetermined air permeability.

Note that, in the kneading step, 100 parts by weight of the ultra-high molecular weight polyethylene, 5 parts by weight to 200 parts by weight of a low molecular weight polyolefin having a weight-average molecular weight of 10000 or less, and 100 parts by weight to 400 parts by weight of an inorganic filler can be kneaded.

Subsequently, in a coating step, the heat-resistant layer 4 is formed on a surface of the porous film 5. For example, on the porous film 5, an aramid/N-methyl-pyrrolidone (NMP) solution (coating solution) is applied, and thereby the heat-resistant layer 4 that is an aramid heat-resistant layer is formed. The heat-resistant layer 4 can be provided on only one surface or both surfaces of the porous film 5. Alternatively, for coating, the heat-resistant layer 4 can be formed by using a mixed solution containing a filler such as alumina/carboxymethyl cellulose.

A method for coating the porous film 5 with a coating solution is not specifically limited as long as uniform wet coating can be carried out by the method. The method can be a conventionally publicly known method such as a capillary coating method, a spin coating method, a slit die coating method, a spray coating method, a dip coating method, a roll coating method, a screen printing method, a flexo printing method, a bar coater method, a gravure coater method, or a die coater method. The heat-resistant layer 4 has a thickness which can be controlled by adjusting (i) a thickness of a coating wet film and (ii) a solid-content concentration in the coating solution.

Note that it is possible to use a resin film, a metal belt, a metal drum, or the like as a support with which the porous film 5 is fixed or transferred in coating.

As described above, it is possible to produce the separator 12 (heat-resistant separator) in which the heat-resistant layer 4 is laminated on the porous film 5. Thus produced separator is wound on a cylindrical core. Note that a subject to be produced by the above production method is not limited to the heat-resistant separator. The above production method does not necessarily include the coating step. In a case where the method includes no coating step, the subject to be produced is a separator including no heat-resistant layer.

[Embodiment 1]

The heat-resistant separator or the separator including no heat-resistant layer (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. This is referred to as a separator original sheet. After the separator original sheet is once produced, the separator original sheet is cut (slit) by the slitting apparatus so that a "separator width" (which means a length in a direction substantially perpendicular to a machine direction and a thickness direction) of the separator original sheet becomes the product width, and thus a long separator sheet is obtained. In Embodiment 1, the long separator sheet or the laminated long separator sheet is a separator or a laminated separator which is longer in the machine direction. The configuration "longer in the machine direction" means that the separator has a length that is 5 m or longer in the machine direction. Each of the long separator sheet and the laminated long separator sheet preferably has a length of 5 m or longer and 10000 m or shorter.

In the following descriptions, a wide separator which is before being slit is referred to as "separator original sheet", and a separator which has been slit so as to have a separator width that is the product width is particularly referred to as "long separator sheet". Note that "slitting" means to slit the separator original sheet in the machine direction (i.e., a flow direction of the film during production; MD), and that "cutting" means to cut the long separator sheet in a transverse direction (TD). The "transverse direction (TD)" means a direction which is substantially perpendicular to the machine direction (MD) and the thickness direction of the long separator sheet.

(Laminated Separator Roll)

(a) of FIG. 4 is a schematic view illustrating a configuration of a slitting apparatus 6 which includes a cutting device 7. (b) of FIG. 4 is a view illustrating a state in which a laminated separator original sheet 12O is slit into a plurality of laminated long separator sheets 12a and 12b by the slitting apparatus 6.

Embodiment 1 exemplifies the laminated separator original sheet 12O in which a wholly aromatic polyamide (aramid resin layer) as the heat-resistant layer 4 (porous layer) is laminated on one surface of the porous film 5 (which is a polyolefin porous base material in Embodiment 1), as illustrated in FIG. 3. Note, however, that Embodiment 1 is not limited to this, and the laminated separator original sheet 12O can include other porous layer such as an adhesive layer or a protective layer, instead of the heat-resistant layer 4.

As illustrated in (a) of FIG. 4, the slitting apparatus 6 includes a wind-off roller 63 which is rotatably supported and has a cylindrical shape, rollers 64, 65, 68U, 68L, 69U, and 69L, a first touch roller 81U, a second touch roller 81L, a first arm 82U, a second arm 82L, a first take-up assisting roller 83U, a second take-up assisting roller 83L, a first winding-up roller 70U, a second winding-up roller 70L, and the cutting device 7.

In the slitting apparatus 6, a cylindrical core c is attached onto the wind-off roller 63, and the laminated separator original sheet 12O is wound on the core c. The laminated separator original sheet 12O is wound off from the core c along a route U or L. In a case where the laminated separator original sheet 12O is to be transferred while a surface A of the laminated separator original sheet 12O serves as an upper surface, the laminated separator original sheet 12O is wound off along the route L. Whereas, in a case where the laminated separator original sheet 12O is to be transferred while a surface B of the laminated separator original sheet 12O serves as an upper surface, the laminated separator original sheet 12O is wound off along the route U. Note that, in Embodiment 1, the laminated separator original sheet 12O is transferred while the surface A serves as an upper surface, and therefore the laminated separator original sheet 12O is wound off along the route L. Note that the porous long separator sheet 12O which has been wound into a roll is referred to as "porous separator roll 12P".

In Embodiment 1, the surface A is a surface of the porous film 5 which surface is opposite to a surface making contact with the heat-resistant layer 4, and the surface B is a surface of the heat-resistant layer 4 which surface is opposite to a surface making contact with the porous film 5.

The laminated separator original sheet 12O which has been thus wound off is transferred to the cutting device 7 via the roller 64 and the roller 65, and is then slit into a plurality of laminated long separator sheets 12a and 12b by the cutting device 7 (see (a) and (b) of FIG. 4).

Among the plurality of laminated long separator sheets 12a and 12b which have been slit by the cutting device 7, each of the long separator sheets 12a is transferred via the roller 68U, the roller 69U, and the first take-up assisting roller 83U, and is then wound on a cylindrical core u (bobbin) that is attached onto the first winding-up roller 70U (see (a) of FIG. 4). Moreover, each of the long separator sheets 12b among the plurality of laminated long separator sheets 12a and 12b is transferred via the roller 68L, the roller 69L, and the second take-up assisting roller 83L, and is then wound on a cylindrical core l (bobbin) that is attached onto the second winding-up roller 70L. Note that the laminated long separator sheets 12a and 12b which have been wound into rolls are referred to as "laminated separator rolls 12U and 12L".

In the laminated separator rolls 12U and 12L, the laminated long separator sheets 12a and 12b are wound so that the surface A of each of the laminated long separator sheets 12a and 12b faces outside and the surface B of each of the laminated long separator sheets 12a and 12b faces inside.

As such, it is possible to obtain the laminated long separator sheets 12a and 12b in which the porous film 5 and the heat-resistant layer 4 (porous layer) are laminated. The laminated long separator sheets 12a and 12b wound into rolls are referred to as "laminated separator rolls 12U and 12L".

(a) of FIG. 5 illustrates each of the laminated separator rolls 12U, 12L, and 12P in which the laminated long separator sheet 12a or 12b or the laminated separator original sheet 12O is wound such that the surface B faces an inner side (core u, l, c side).

Meanwhile, (b) of FIG. 5 illustrates each of laminated separator rolls 12U', 12L', and 12P' in which the laminated long separator sheet 12a or 12b or the laminated separator original sheet 12O is wound such that the surface A faces an inner side (core u, l, c side). In each of the laminated separator rolls 12U', 12L', and 12P', the laminated long separator sheet 12a or 12b or the laminated separator original sheet 12O is wound such that the surface B of the laminated long separator sheet 12a or 12b or the laminated separator original sheet 12O faces the outer side and the surface A of the laminated long separator sheet 12a or 12b or the laminated separator original sheet 12O faces the inner side. That is, each of the laminated separator rolls 12U, 12L, and 12P has an outermost surface which is constituted by the polyolefin porous base material (porous film 5), and each of the laminated separator rolls 12U', 12L', and 12P' has an outermost surface which is constituted by the porous layer (heat-resistant layer 4).

(Transmittance of Porous Film)

FIG. 6 is a view showing a transmittance, with respect to wavelengths, of the polyolefin porous base material which is the porous film 5 containing polyolefin. The transmittance of the polyolefin porous base material is obtained as follows: (i) light is adjusted with use of a light shielding material so that the polyolefin porous base material is irradiated with light of 4 mmφ, (ii) three locations of the polyolefin porous base material are measured with use of an ultraviolet and visible spectrophotometer UV-2450 (manufactured by Shimadzu Corporation) such that a part at which an amount of resin in the thickness direction of the polyolefin porous base material is smallest becomes a center of measurement, and (iii) measurement results of the three locations are averaged.

As shown in FIG. 6, the polyolefin porous base material which is the porous film 5 is low in transmittance with respect to light in the ultraviolet region, and can therefore weaken incoming light that enters the polyolefin porous base material and has a particular wavelength within the ultraviolet region.

A thickness of the polyolefin porous base material is preferably 5 μm or more, and more preferably 7 μm or more. As the thickness increases, it is possible to block UV light more. A porosity of the polyolefin porous base material is preferably 65% or lower, more preferably 55% or lower, and further preferably 45% or lower. As the porosity decreases, it is possible to block UV light more. Note that the polyolefin porous base material used in Embodiment 1 has a thickness of 13.5 μm and a porosity of 48%.

In each of the laminated separator rolls 12U, 12L, and 12P, the laminated long separator sheet 12a or 12b or the laminated separator original sheet 12O is wound such that the porous layer comes to the inner side (core u, l side) and the porous film 5 comes to the outer side (opposite to core u, l side), and thus the porous film 5 serves as the outermost surface of each of the laminated separator rolls 12U, 12L, and 12P (see (a) of FIG. 5). With the configuration, it is possible to inhibit the porous layer (heat-resistant layer 4) from being exposed to UV light by the porous film 5 that is arranged on the outer side of the porous layer, and this makes it possible to inhibit color change from occurring in the porous layer containing a particular resin.

(Degree of Color Change in Porous Layer (Aramid Layer) by irradiation with UV Light)

(a) of FIG. 7, (b) of FIG. 7, and (c) of FIG. 7 show degrees of change in color of the porous layer (heat-resistant layer 4) by irradiation with (i) UV light from a polyolefin porous base material side which is the porous film 5 and (ii) UV light from an aramid layer side which is the porous layer.

A measurement result of a reference sample (reference 1) is obtained from the following conditions: the laminated long separator sheets 12a and 12b are cut out from the laminated separator rolls 12U and 12L in which the laminated long separator sheets 12a and 12b are wound such that the porous film 5 comes to the inner side (core u, l side) and the porous layer serves as the outermost surface as illustrated in (b) of FIG. 5; the laminated long separator sheets 12a and 12b are irradiated with UV light from the aramid layer side which is the porous layer; and the aramid layer is measured. A measurement result of a sample 1 is obtained from the following conditions: the laminated long separator sheets 12a and 12b are cut out from the laminated separator rolls 12U and 12L in which the laminated long separator sheets 12a and 12b are wound such that the porous layer (aramid layer) comes to the inner side (core u, l side) and the polyolefin porous base material serves as the outermost surface as illustrated in (a) of FIG. 5; the laminated long separator sheets 12a and 12b are irradiated with UV light from the polyolefin porous base material side; and the porous layer (aramid layer) is measured.

That is, the measurement result of the reference sample (reference 1) is a measurement result in a case where the aramid layer is arranged on a front side (i.e., UV light irradiation side), and the measurement result of the sample 1 is a measurement result in a case where the aramid layer is arranged on a back side (i.e., opposite to UV light irradiation side).

The degrees of change in color of the aramid layers by irradiation with UV light in the reference sample (reference 1) and the sample 1 are evaluated with use of values of $\Delta WI$ and $\Delta YI$.

$\Delta WI$ is a value defined by the following formula (1): $\Delta WI = WI_1 - WI_0$. Here, WI is a white index defined in E313 of American Standards Test Methods.

$WI_0$ (pre-process WI) is WI of a surface of the porous layer measured with a spectrophotometric colorimeter before the porous layer is irradiated with UV light of 255 W/m$^2$ (i.e., before starting irradiation with UV light of 255 W/m$^2$). $WI_1$ (post-process WI) is WI of a surface of the porous layer measured with the spectrophotometric colorimeter after the porous layer has been irradiated with UV light of 255 W/m$^2$ for 75 hours.

$\Delta YI$ is defined by the following formula (2): $\Delta YI = YI_1 - YI_0$. Here, YI is a yellow index.

$YI_0$ (pre-process YI) is YI of a surface of the porous layer measured with the spectrophotometric colorimeter before the porous layer is irradiated with UV light of 255 W/m$^2$ (i.e., before starting irradiation with UV light of 255 W/m$^2$). $YI_1$ (post-process YI) is YI of a surface of the porous layer measured with the spectrophotometric colorimeter after the porous layer has been irradiated with UV light of 255 W/m$^2$ for 75 hours.

As is clear from the measurement results of the reference sample (reference 1) and the sample 1 shown in (a) through (c) of FIG. 7, values of $\Delta WI$ and $\Delta YI$ of the sample 1 are smaller than values of $\Delta WI$ and $\Delta YI$ of the reference sample (reference 1).

Therefore, in the sample 1, changes in white index and yellow index caused due to irradiation with UV light are smaller than those in the reference sample (reference 1).

This is because, in the sample 1, the polyolefin porous base material which is the porous film 5 can inhibit the aramid layer (i.e., the porous layer) from being exposed to UV light.

In a case where the porous layer of the laminated separator is partially changed in color, an amount of transmitted light or an amount of reflected light at a particular wavelength changes when, in particular, an optical testing device and a control device are used. This may lead to erroneous detection in measuring a weight per unit area or measuring a film location.

Note that, as shown in (a) of FIG. 7, an average transmittance (%) of the polyolefin porous base material which is the porous film 5 at the wavelengths of 360 nm to 390 nm is 0.13%, and an average absorbance of the polyolefin porous base material which is the porous film 5 at the wavelengths of 360 nm to 390 nm is 2.89.

As the spectrophotometric colorimeter, for example, an integrating sphere spectrophotometric colorimeter can be suitably used so as to easily and accurately measure WI and YI. The integrating sphere spectrophotometric colorimeter is a device which (i) irradiates a sample with light of a xenon lamp, (ii) collects reflected light from the sample to a light receiving section by an integrating sphere which surrounds the irradiated part, and (iii) carries out optical spectrometry. With use of the integrating sphere spectrophotometric colorimeter, it is possible to measure various optical parameters. Note, however, that the spectrophotometric colorimeter is not particularly limited to the integrating sphere spectrophotometric colorimeter and can be any spectrophotometric colorimeter which can measure WI and YI. In Embodiment 1, WI of the separator is measured with use of a spectrophotometric colorimeter (CM-2002, manufactured by KONICA MINOLTA, INC.) under condition of Specular Component Include (SCI). In this case, WI is measured while using a black paper (manufactured by Hokuetsu Kishu Paper Co., Ltd., high-quality colored paper, black, thickest, paper size: 788 mm×1091 mm, grain long) as an underlay of the separator.

The "surface of the porous layer" indicates a part of the porous layer which part receives light emitted from the spectrophotometric colorimeter. WI and YI of the surface of the porous layer can be measured by the spectrophotometric colorimeter in accordance with an instruction manual of the spectrophotometric colorimeter and the measurement method is not limited to a particular one. For example, it is preferable that the porous layer is irradiated with light while being placed on a black paper so that reflected light from the porous layer can be easily collected at the light receiving section of the spectrophotometric colorimeter.

It is preferable that irradiation with the UV light of 255 W/m$^2$ is carried out with use of a device which can carry out continuous UV light irradiation. For example, it is possible to use a lightfastness testing machine or a weatherability testing machine defined in JIS B 7753 (e.g., Sunshine Weather Meter S80 manufactured by Suga Test Instruments Co., Ltd.). The UV light irradiation is carried out by irradiating a test piece with light by a sunshine carbon arc (four pairs of ultra-long life carbon) light source for 75 hours under the following conditions: a discharging voltage is 50 V, a discharging current is 60 A, a black panel temperature is 60° C., and a relative humidity is 50%.

In Embodiment 1, the porous long separator sheets 12a and 12b and the porous separator original sheet 12O are exemplified in each of which two layers, i.e., the polyolefin porous base material which is the porous film 5 and the aramid layer which is the porous layer (heat-resistant layer 4) are laminated, and the laminated separator rolls 12U, 12L, and 12P are described in each of which the laminated long separator sheet 12a or 12b or the porous separator original sheet 12O is wound such that the porous layer (aramid layer) comes to the inner side (core u, 1 side) and the porous film 5 comes to the outer side (opposite to core u, 1 side). Note, however, that Embodiment 1 is not limited to this, and the porous long separator sheet can have a lamination structure of three or more layers such as a heat-resistant layer, an adhesive layer, and a protective layer.

Such a configuration in which the porous long separator sheet has a lamination structure of three or more layers can be employed, provided that the outermost surface of the laminated separator roll is the polyolefin porous base material included in the laminated long separator sheet.

[Main Points]

In the laminated separator roll in accordance with an aspect 1 of the present invention, a laminated long separator sheet in which a polyolefin porous base material and a porous layer are laminated is wound on a core; the porous layer contains a resin having a π bonding or halogen atoms; and an outermost surface of the laminated separator roll is constituted by the polyolefin porous base material included in the laminated long separator sheet.

According to the configuration, it is possible to inhibit change in color of the porous layer included in the porous long separator sheet.

In the laminated separator roll in accordance with an aspect 2 of the present invention, it is possible that the resin having a π bonding or halogen atoms can be a polymer having halogen atoms or can be an aromatic polymer.

According to the configuration, it is possible to provide the laminated separator roll in which the porous layer containing a polymer having halogen atoms or an aromatic polymer can be protected from incoming light in the ultraviolet region by the porous base material that contains polyolefin.

[Additional Remarks]

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

INDUSTRIAL APPLICABILITY

The present invention is applicable to a separator roll and the like which are used in batteries such as a lithium-ion battery.

REFERENCE SIGNS LIST

1: Lithium-ion secondary battery
4: Heat-resistant layer (porous layer)
5: Porous film (polyolefin porous base material)
12: Separator
12a: Laminated long separator sheet
12b: Laminated long separator sheet
12U: Laminated separator roll
12L: Laminated separator roll
12P: Laminated separator roll
12U': Laminated separator roll
12L': Laminated separator roll
12P': Laminated separator roll
12O: Laminated separator original sheet
l: Core
u: Core
c: Core
MD: Machine direction of long separator sheet or separator original sheet
TD: Transverse direction of long separator sheet or separator original sheet
Surface A: Surface of porous film which surface is opposite to a surface contacting with heat-resistant layer
Surface B: Surface of heat-resistant layer which surface is opposite to a surface contacting with porous film

The invention claimed is:

1. A laminated separator roll comprising a laminated separator sheet wound on a core, wherein the laminated separator sheet comprises a polyolefin porous base material having first and second opposing surfaces, wherein a porous layer containing a resin having π bonding or halogen atoms is laminated on the first surface of the porous base material, and wherein an outermost surface of the laminated separator roll is the second surface of the porous base material.

2. The laminated separator roll as set forth in claim 1, wherein the resin having π bonding or halogen atoms is a polymer having halogen atoms or is an aromatic polymer.

3. The laminated separator roll as set forth in claim 1, wherein the porous layer is an aramid resin layer.

* * * * *